(12) United States Patent
Messer

(10) Patent No.: US 7,716,361 B2
(45) Date of Patent: May 11, 2010

(54) METHOD AND SYSTEM FOR PROVIDING PERSISTENT MEDIA ACROSS WEB PAGES USING ONLY BROWSER PLUG-INS

(75) Inventor: Alan Messer, Los Gatos, CA (US)

(73) Assignee: Samsung Electronics Co., Ltd., Suwon (KR)

( * ) Notice: Subject to any disclaimer, the term of this patent is extended or adjusted under 35 U.S.C. 154(b) by 1042 days.

(21) Appl. No.: 11/418,996

(22) Filed: May 4, 2006

(65) Prior Publication Data
US 2007/0260700 A1 Nov. 8, 2007

(51) Int. Cl.
*G06F 15/16* (2006.01)
(52) U.S. Cl. ........................ 709/231; 709/217
(58) Field of Classification Search ................ 709/217, 709/231
See application file for complete search history.

(56) References Cited

U.S. PATENT DOCUMENTS

2005/0166136 A1* 7/2005 Capps et al. .......... 715/500.1

* cited by examiner

*Primary Examiner*—Ario Etienne
*Assistant Examiner*—Hee Soo Kim
(74) *Attorney, Agent, or Firm*—Kenneth L. Sherman, Esq.; Michael Zarrabian, Esq.; Myers Andras Sherman LLP

(57) ABSTRACT

A method and system for providing persistent media across Web pages using only browser plug-ins. Media selected through a Web browser can play in a way that is embedded in the content, but the media can continue to play while Web pages transition. The content providers benefit from the flexibility of content use, while the user can enjoy playing media without interruptions. The media can stop persisting when the content provider so chooses.

14 Claims, 3 Drawing Sheets

METHOD AND SYSTEM FOR PROVIDING PERSISTENT MEDIA ACROSS WEB PAGES USING ONLY BROWSER PLUG-INS

FIELD OF THE INVENTION

The present invention relates generally to media play back methods, and more particularly, to providing persistent media across web pages.

BACKGROUND OF THE INVENTION

Web browsers pervade computers, including consumer devices. With the proliferation of available content on the Internet, there is increasing need for media access from Web pages.

One conventional approach to media access from Web pages is a fire and forget method. This method provides the media in a Web server and starts a media player when a corresponding link on a Web page is clicked. The media runs in a separate application independent of the Web page. However, this is not a desirable consumer experience because the media being played in the separate application is not integrated and tied to the related information in the Web browser.

Another conventional approach to media access from Web pages is an embedded window method. In this method, the accessed media is embedded in a Web browser window using a plug-in. When the media-related Web page loads, the plug-in creates a window in the Web browser and plays the media in that window. If the user clicks a link to another page, the plug-in and window are removed and the media stops. However, this provides a very poor user experience because the media cannot persist across many similar pages.

Another conventional approach to media access from Web pages involves a framed window method. This method uses the aforementioned embedded window method to play the media, but places it in a separate frame. Since it is in a separate window, the media can continue to play. However, this method is undesirable because it requires reserving an area of the screen (e.g., a corner or top/bottom) for the media playback, and makes it difficult to allocate more than just a corner of the screen.

BRIEF SUMMARY OF THE INVENTION

In one embodiment, the present invention provides a method and system for providing persistent media across Web pages using only browser plug-ins. Accordingly, media selected through a Web browser can play in a way that is embedded in the content, but the media can continue to play while Web pages transition.

An embodiment of media playback system for providing persistent media across Web pages according to the present invention, comprises: a browser component that interfaces to a Web browser; a media playback component that interfaces to an underlying media module; wherein the browser component communicates media requests from a Web page to the media playback component via a channel, such that the media playback component plays the requested media into an assigned window.

When the Web page changes to a new Web page, the media playback component continues to play the requested media such that media playback persists across two or more Web page changes. The browser component comprises a media object plug-in in the Web browser that connects with the media playback component. The media object plug-in connects with the media playback component and passes the media request and assigned window information to the media playback component. In one example, the browser component comprises a browser plug-in (which has a window in the web page).

When the Web page is changed to a new Web page, the media playback component continues to play the requested media. And, when the new Web page is loaded into the Web browser, the new Web page includes a media object with the same media source as the previous Web page. Further, when the new Web page is loaded into the Web browser, a media object plug-in for the new Web page reconnects to the media playback component and passes the media request and assigned window information to the media playback component.

The media playback component further awaits a timeout, such that if the media object plug-in of the new Web page reconnects to the media playback component before the timeout expires, the media playback component continues to play the requested media. If the media object plug-in of the new Web page does not reconnect to the media playback component before the timeout expires, the media playback component stops the requested media playback. The requested media needs to be the same as the requested media for the previous Web page.

When the Web page changes to a new Web page, the media playback component checks for the persistence flag, such that if the persistence flag is set, the media playback component continues to play the requested media. The media playback component continues to play the requested media across multiple new Web page changes as long as the persistence flag is set for each prior Web page.

As such, the content providers can benefit from the flexibility of content use, while the user can enjoy playing media without interruptions. Lastly, the media can stop persisting when the content provider so chooses, rather than conventional approaches where the application can persist indefinitely.

These and other features, aspects and advantages of the present invention will become understood with reference to the following description, appended claims and accompanying figures.

DETAILED DESCRIPTION OF THE DRAWINGS

Conventionally, playing media in a web page only lasts the duration of the web page. However, in the consumer space, media can often play independent of the information on screen. As a result, there has been a need for playing media in Web pages that can persist after a web page has changed.

In one embodiment, the present invention provides a method and system for providing persistent media across Web pages using only browser plug-ins. Accordingly, media selected through a Web browser can play in a way that is embedded in the content, but the media can continue to play while Web pages transition. In the description herein, content comprises the web page, media is the audio/video playing in the web page. Content is in e.g. HTML, while media is Audio/Visual (A/V) form.

As such, the content providers can benefit from the flexibility of content use, while the user can enjoy playing media without interruptions. Lastly, the media can stop persisting when the content provider so chooses, rather than conventional approaches where the application can persist indefinitely.

Figure 1A:
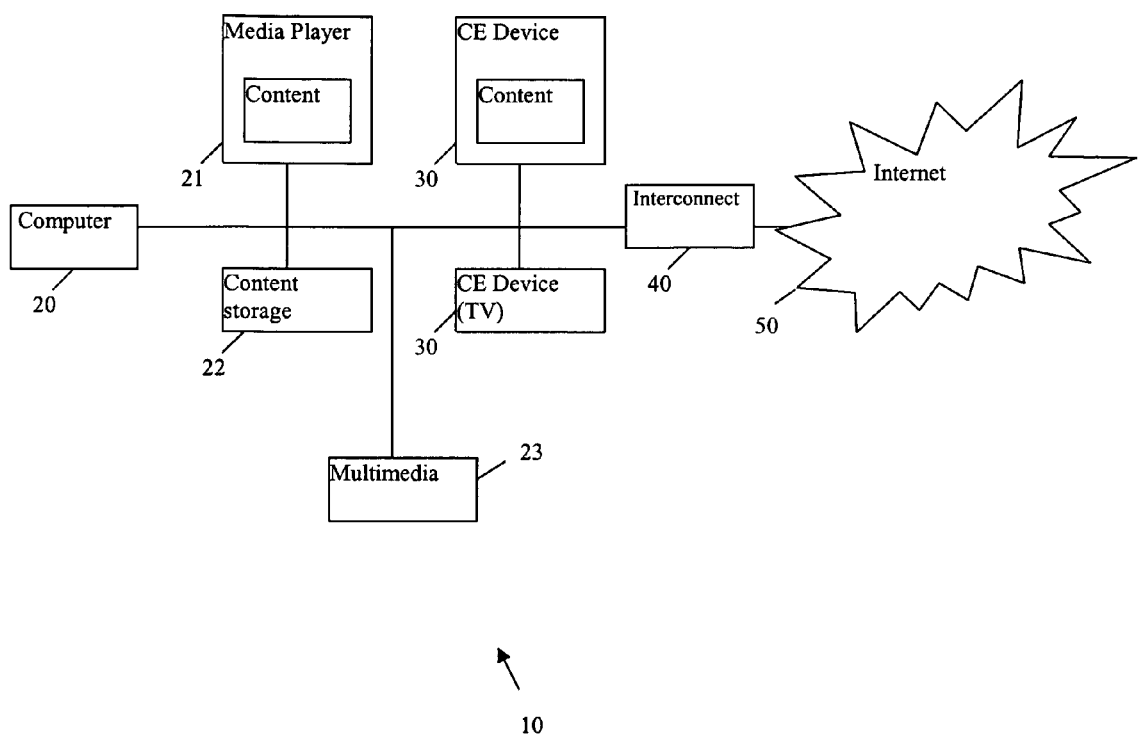
FIG. 1A shows an example of a network implementing an embodiment of the present invention.

FIG. 1A shows a functional architecture of an example network 10, such as a local network (e.g., home network), embodying aspects of the present invention. As such, the network 10 provides persistent media across Web pages on the Internet 50 using only browser plug-ins, according to the present invention. The network 10 comprises a PC 20, a media player 21 which may include content, content storage 22, multimedia device 23, consumer electronic (CE) devices 30 (e.g., TV, cell phone, PDA, etc.) which may include content, and interconnect 40 that connects the network 10 to the Internet 50.

Figure 1B:
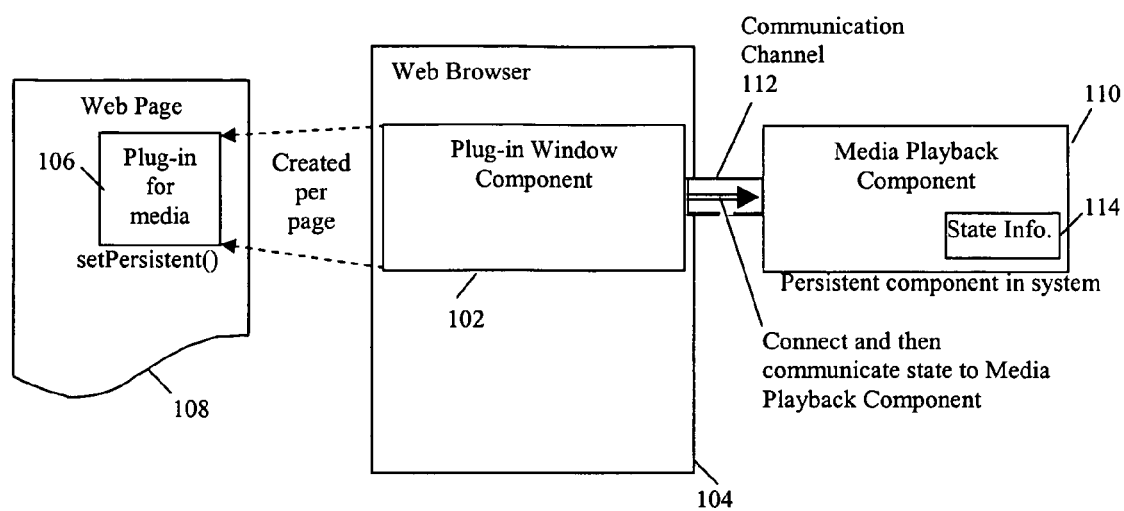
FIG. 1B shows an example functional diagram of a method of providing persistent media across web pages using only browser plug-ins, according to an embodiment of the present invention.
Figure 2:
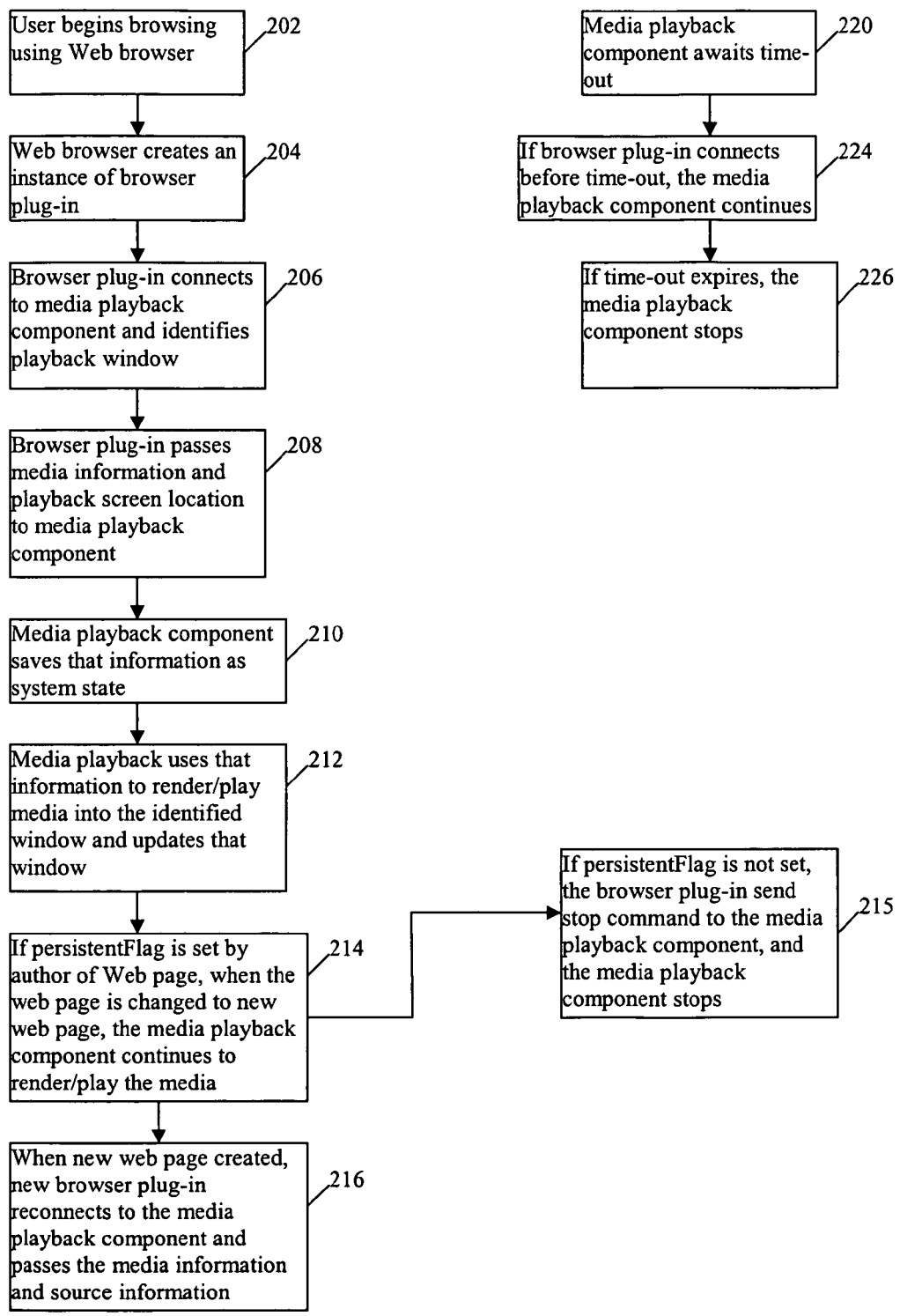
FIG. 2 shows a flowchart of an embodiment of the steps of method of providing persistent media across web pages using only browser plug-ins, according to an embodiment of the present invention.

Referring to the example functional diagram in FIG. 1B and the example flowchart 200 in FIG. 2, a method of providing persistent media across web pages using only browser plug-ins, according to an embodiment of the present invention, in network 10 is now described.

A media playback support system 100 (FIG. 1B) for a particular device, (e.g., a Digital TV, PDA, mobile tablet, etc.) comprises two functional components. The first functional component comprises a browser component 102 (e.g., running on PC 20 in FIG. 1A), which interfaces to a Web browser 104 (e.g., running on PC 20 in FIG. 1A) using a communication (connection) process. In FIG. 1B, an example is shown wherein an instance of the browser component 102 comprises a plug-in 106 for a Web page 108. In the browser component 102, any form of interface to the Web browser 104 can be used (e.g., some browsers support 'extensions'). The browser component 102 interfaces to the Web browser 104 and provides a means for a script language (e.g., Javascript) to run in the web page to call functions of a Javascript object representing the media in HTML which is an instance of the plug-in 106. The browser plug-in 106 has a window in the web page 108.

The second functional component comprises a media playback component 110 (e.g., media player 21 in FIG. 1A) that communicates with the underlying media software module (e.g., devices 22, 23 in FIG. 1A). In integrated implementations, the media playback component 110 can comprise the underlying media codecs/drivers, etc. There media playback component uses underlying libraries, codecs, to achieve and control AV playback.

In the following, the establishment and re-establishment of the communication channel 112 between the functional components 102 and 110 is further described.

The two functional components 102, 110 operate as separate components in the system and communicate through a communication channel interface 112. One example implementation is to operate each of the functional components 102, 110 in a separate operating system (OS) process, and setup a communication channel (e.g., UNIX, RTOS Inter-Process Communication (IPC), etc.) between the two functional components 102, 110.

As noted, the browser component 102 communicates with the Web browser 104 and provides a means for a script language (e.g., Javascript) to run in the web page to call functions of Javascript object representing the media in HTML which is an instance of the plug-in 106. One example of this is the API that a plug-in 106 can support for a media object plug-in in a Web browser. In the example of FIG. 1B, in addition to the normal interface APIs such as Play( ), the browser component 102, instantiated as the plug-in 106, provides two extra functions with APIs: setPersistent( ) and persistenceTimeout( ). The persistenceTimeout( ) function is optional and can be hardwired in the browser component 102. The setPersistent( ) function allows the web content provider's Javascript code to inform the Web browser 104 that the media running in the embedded media object should persist when the web page (i.e., content), is changed (e.g., after a user clicks on a link).

When a first web page containing media content is created by a user browsing (step 202), the web browser creates an instance of the browser component 102 (i.e., plug-in 106 which has a window in the web page 108) for media playback in the web page (step 204). Once created, the plug-in 106 connects to the media playback-component 110 which is already running in the background and informs the media playback component 110 of the identify of window into which the media playback component 110 must process (e.g., decode, render, play the media) the media (step 206). The communication between the plug-in 106 and the media playback component 110 is performed through the aforementioned communication channel 112.

As the user uses the web page, the plug-in 106 communicates with the media playback component 110 to pass on information on what media to play and what location on the screen the media object (e.g., Javascript object in the HTML representing the A/V) is currently located to e.g. allow for scrolling through a page (step 208). This information is kept in the media playback component 110 as a system state 114 (step 210). Using this state information the media playback component 110 renders/plays the media into an assigned window 102 and updates the window 102 as the Web page is scrolled (step 212). The assigned window is identified in step 208 above by the plug-in 106 which passes the window ID down the channel 112 to the media component 110. In this example, the ID of the assigned window 102 is passed around the time when the browser component 102 (e.g., plug-in 106) and the media playback component 110 connect.

If the setPersistent( ) function was specified (i.e., persistentFlag is set) by the author of the web page 108, when the Web page 108 is changed to a new Web page, the media playback component 110 continues to play the media (step 214). Accordingly, when the new Web page is loaded into the Web browser 104, that new Web page also contains a media object with the same media source information (i.e., the URL in the HTML that indicates the URL to pull on for the AV) as the previous Web page 108 for the AV to persist. When the new Web page is created, as before, a new plug-in 106 component re-connects to the media playback component 110 and passes the location information (e.g., window ID, window positions, etc) and said source information, to the media component 110 (step 216).

Meanwhile, the media playback component 110 waits for a timeout (step 220). If the plug-in 106 of the next/new Web page reconnects to the media playback component 110 before the timeout expires, the media playback component 110 continues to play/render the media and synchronizes with the information (e.g., window location, position update, etc.) of the plug-in 106 (step 222).

If the timeout expires before the reconnect, the media playback component 110 stops the media playback since it is assumed that the next/new Web page failed for some reason, or a programming error on the web page left the persistent flag active (i.e., persistentFlag is set), but went to a page containing different or no media (step 226). Note that the setPersistent( ) call is best used by the Javascript when a link is clicked by a user. For example, when a link is clicked, this causes the Javascript to call setPersistent( ), whereby media playback is only persistent when the user navigates in certain directions.

Media playback may persist across multiple Web page changes, as long as the persistentFlag is set for each prior web page.

Back in step 214, if the persistentFlag is not set, when the web page is changed the plug-in 106 sends a stop command to the media playback component 110 as it shuts down during the Web page cleanup phase of the web page transition (step 215).

An alternate embodiment according to the present invention, is for information such as position information to be communicated back from the media playback component 110 to the plug-in component 106 to display a progress bar on the screen. As such many types of bi-directional information may be communicated between the browser component 102 and the media playback component 110.

The present invention has been described in considerable detail with reference to certain preferred versions thereof; however, other versions are possible. Therefore, the spirit and scope of the appended claims should not be limited to the description of the preferred versions contained herein.

What is claimed is:

1. A media playback system for providing persistent media across Web pages, comprising:
   a browser component that interfaces to a Web browser;
   a media playback component that interfaces to an underlying media module, said media playback component is configured to maintain system state information from the browser component; and
   wherein the browser component and the media playback component operate as separate components, and the browser component communicates the media requests from a Web page to the media playback component via a communication channel interface, such that the media playback component plays the requested media into an assigned window based on the system state information; and
   wherein the browser component comprises a media object plug-in in the Web browser, such that the media object plug-in connects with the media playback component and passes the media request and assigned window information to the media playback component;
   wherein when the Web page changes to a Web page, the media playback component checks for a persistence flag, such that if the persistence flag is set, the media playback component continues to play the requested media in the Web page;
   wherein when the new Web page is loaded into the Web browser the media object plug-in for the new Web page reconnects to the media playback component and passes the media request and assigned window information to the media playback component.

2. The system of claim 1, wherein the system state information further comprises media requests and a playback screen location.

3. The system of claim 2 wherein the assigned window is in the Web browser.

4. The system of claim 2 wherein when the Web page changes to a Web page, the media playback component continues to play the requested media such that media playback persists across two or more Web page changes.

5. The system of claim 1 wherein when the new Web page is loaded into the Web browser, the Web page includes a media object with the same media source as the previous Web page.

6. The system of claim 1 wherein the media playback component further awaits a timeout, such that if the media object plug-in of the new Web page reconnects to the media playback component before the timeout expires, the media playback component continues to play the requested media.

7. The system of claim 6 wherein if the media object plug-in of the Web page does not reconnect to the media playback component before the timeout expires, the media playback component stops the requested media playback.

8. A media playback method for providing persistent media across Web pages, comprising the steps of:
   establishing a browser communication process for communication with a Web browser;
   establishing a media playback communication process for interfacing to an underlying media module, said media playback communication process is configured to maintain system state information from the browser communication process;
   receiving a media request from a Web page via the browser communication process;
   wherein the browser communication process and the media playback communication process operate as separate processes, and the browser communication process communicates the media request from a Web page to the media playback communication process via a communication channel interface, such that the media playback communication process plays the requested media into an assigned window based on the system state information;
   wherein the browser communication process comprises a media object plug-in in the Web browser, such that the media object plug-in connects with the media playback communication process and passes the media request and assigned window information to the media playback communication process;
   wherein when the Web page changes to a Web page, the media playback communication process checks for a persistence flag, such that if the persistence flag is set, the media playback communication process continues to play the requested media in the Web page;
   wherein when the Web page is loaded into the Web browser the media object plug-in for the Web page reconnects to the media playback communication process and passes the media request and assigned window information to the media playback communication process.

9. The method of claim 8 wherein the system state information further comprising media requests and a playback screen location.

10. The method of claim 9 wherein the assigned window is in the Web browser.

11. The method of claim 9 further comprising the steps of: when the Web page changes to a new Web page, the media playback communication process continuing to play the requested media such that media playback persists across two or more Web page changes.

12. The method of claim 8 further including the steps of: when the new Web page is loaded into the Web browser, establishing a media object with the same media source as the previous Web page in the new Web page.

13. The method of claim 8 further comprising the steps of: the media playback communication process awaiting a timeout, such that if the media object plug-in of the new Web page reconnects to the media playback communication process before the timeout expires, the media playback communication process continues to play the requested media.

14. The method of claim 13 further including the steps of: if the media object plug-in of the new Web page does not reconnect to the media playback communication process before the timeout expires, the media playback communication process stopping the requested media playback.

* * * * *